(12) United States Patent
Gimpel

(10) Patent No.: US 9,783,261 B2
(45) Date of Patent: Oct. 10, 2017

(54) DEMOUNTABLE DEVICE FOR TRANSFORMATION OF TREADLE LEVER ROCKING MOVEMENT INTO ROTARY MOVEMENT OF BICYCLE#S DRIVE SHAFT

(71) Applicant: Efim Gimpel, Lynn, MA (US)

(72) Inventor: Efim Gimpel, Lynn, MA (US)

( * ) Notice: Subject to any disclaimer, the term of this patent is extended or adjusted under 35 U.S.C. 154(b) by 48 days.

(21) Appl. No.: 14/492,028

(22) Filed: Sep. 21, 2014

(65) Prior Publication Data

US 2016/0152300 A1    Jun. 2, 2016

(51) Int. Cl.
*B62M 6/55* (2010.01)
*B62M 1/24* (2013.01)
*B62K 13/00* (2006.01)

(52) U.S. Cl.
CPC .............. *B62M 6/55* (2013.01); *B62M 1/24* (2013.01); *B62K 13/00* (2013.01)

(58) Field of Classification Search
CPC ........... B62M 6/55; B62M 1/24; B62M 13/00
See application file for complete search history.

(56) References Cited

U.S. PATENT DOCUMENTS

| 3,889,974 | A | * | 6/1975 | Kallander | B62M 1/28 280/251 |
| 4,379,566 | A | * | 4/1983 | Titcomb | B62K 21/18 280/251 |
| 4,630,839 | A | * | 12/1986 | Seol | B62M 1/28 280/236 |
| 5,242,182 | A | * | 9/1993 | Bezerra | B62M 1/30 280/253 |
| 5,368,321 | A | * | 11/1994 | Berman | B62M 1/28 280/221 |
| 5,716,069 | A | * | 2/1998 | Bezerra | B62M 1/30 280/253 |
| 6,032,970 | A | * | 3/2000 | Porter | B62M 1/12 280/234 |
| 7,111,860 | B1 | * | 9/2006 | Grimaldos | B62M 1/28 280/221 |
| 2003/0001356 | A1 | * | 1/2003 | Carr | B62K 3/002 280/258 |
| 2007/0114749 | A1 | * | 5/2007 | Tal | B62M 1/28 280/221 |
| 2009/0023527 | A1 | * | 1/2009 | Bronson | B62K 3/002 474/119 |
| 2012/0252622 | A1 | * | 10/2012 | Yang | B62M 11/04 475/167 |
| 2013/0025383 | A1 | * | 1/2013 | Chen | B62M 1/36 74/43 |
| 2013/0205928 | A1 | * | 8/2013 | Hansen | B62M 1/24 74/37 |
| 2014/0361511 | A1 | * | 12/2014 | Thompson | B62M 1/30 280/262 |
| 2016/0229483 | A1 | * | 8/2016 | Zhou | B62M 1/12 |

* cited by examiner

*Primary Examiner* — David M Fenstermacher
(74) *Attorney, Agent, or Firm* — Nadya Reingand; Yan Hankin; Vladislav Levenets

(57) ABSTRACT

Demountable devices for transformation of treadle lever rocking movement into rotary movement of bicycle's drive shaft consist of two main units: redesigned driving unit for conventional bicycles and a reverse gear. Both units interact with each other through a flexible transmission. The devices can be mounted on most conventional bicycles. Bicycle's movement is provided by regular pressing of the cyclist's leg on the treadle lever. Length of the treadle lever can be adjustable.

3 Claims, 7 Drawing Sheets

DEMOUNTABLE DEVICE FOR TRANSFORMATION OF TREADLE LEVER ROCKING MOVEMENT INTO ROTARY MOVEMENT OF BICYCLE#S DRIVE SHAFT

This application is continuation-in part the United States Non-provisional application, which claim the benefit of U.S. Parent patent application Ser. No. 14/120,914 Filed Jul. 7, 2014, the entire disclosure of which is incorporated herein by reference.

FIELD OF INVENTION

The invention realizes human-powered transmission designed to be mounted on vehicles such as bicycles, tricycles, wheelchairs, watercrafts, etc.

BACKGROUND OF INVENTION

Over the years, there were many attempts to overcome the inherent inefficiencies of rotation treadle transmission used for bicycles and similar vehicles. The main mechanical and ergonomic problem is losing of force/torque when treadle is closed to top and bottom dead points. Calculations show that elimination of "dead spots" could save up to 30% of muscular power (see "How to improve the bike" article by Doctor of Science, Prof. Knopp). However, he proposed very complex solutions based on gear entanglements. Japanese company "Alenax" patented similar device (U.S. Pat. No. 4,630,839, 1986). Using such device requires extensive redesign of bicycle. In 2003-2006, Alenax released a modernized swing treadle assembly unit with 6 speed modes, but it required rearrangement of driving chain sprocket unit, and had no commercial success. Inventor Tokunaga Yasuniko received the patent JP 20,110,070,183(A), which could only be applied to bicycles with rocking motion of crank-based mechanism and an extra chain unit. However, both manufacturing and usage of such bicycles were too complex.

SUMMARY OF THE INVENTION

The purpose of the current invention is to optimize the design by allowing to implement transformation of movement types without increasing complexity of production, and to increase exploitation reliability by using the device which can be mounted on the frame of conventional vehicles without the requirement to redesign/replace existing driving axis and sprocket units. Another advantage of the proposed solution is that it is composed up to 80% from standard bicycle parts and units: bicycles's chain sprockets, one-way bearing rotation similar to CKR25PP (VXB.COM) or ratchet, etc.

Similar patent is U.S. Pat. No. 4,630,839

BRIEF DISCRETION OF THE DRAWINGS

Figure 1A:
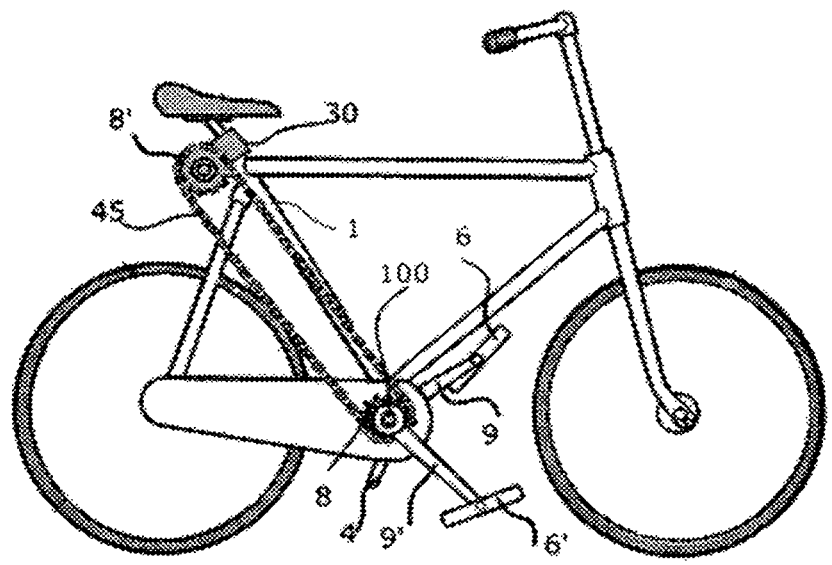

FIG. 1a—A view of the right of a bicycle with present invention

Figure 1B:
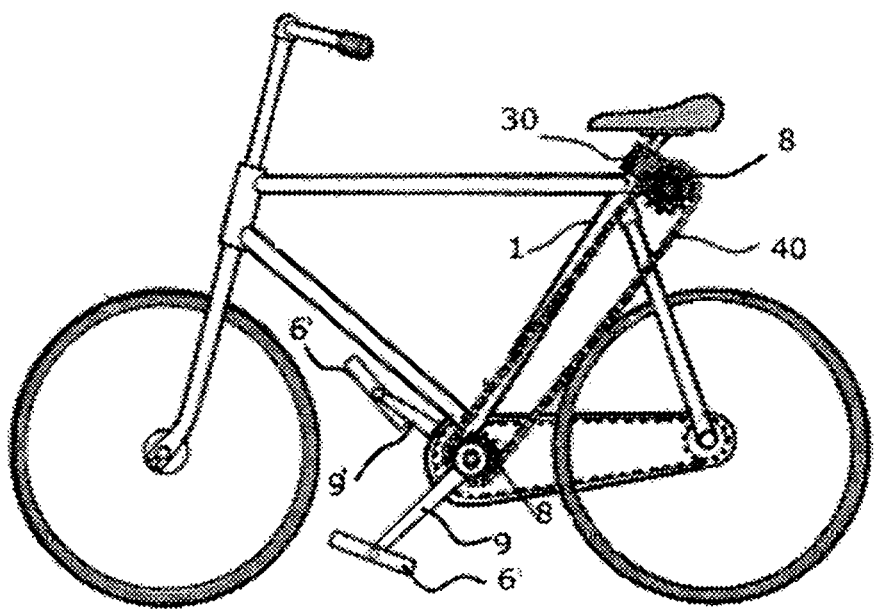

FIG. 1b—A view of the left of a bicycle with present invention

Figure 2:
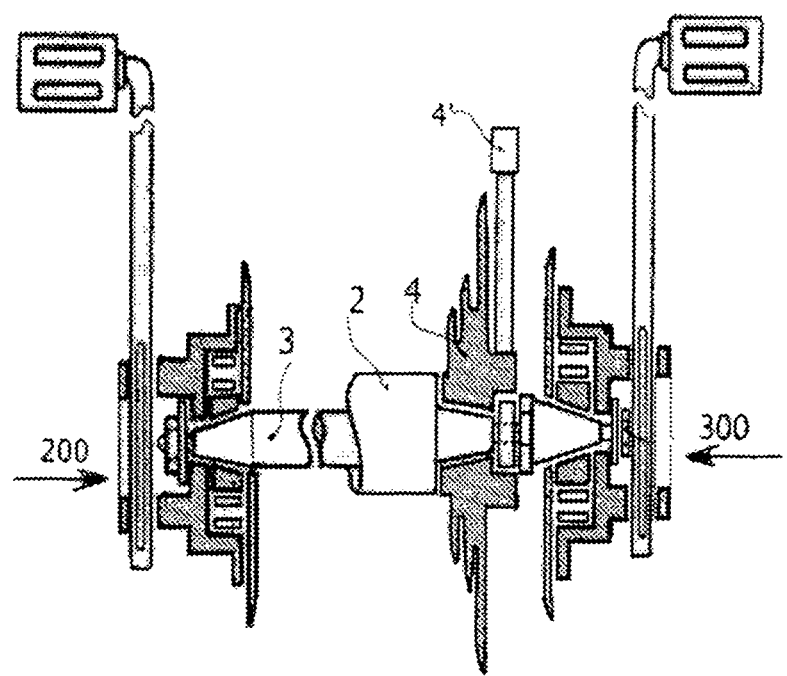

FIG. 2—an assemble drawing of the redesigned drive unit.

Figure 3:
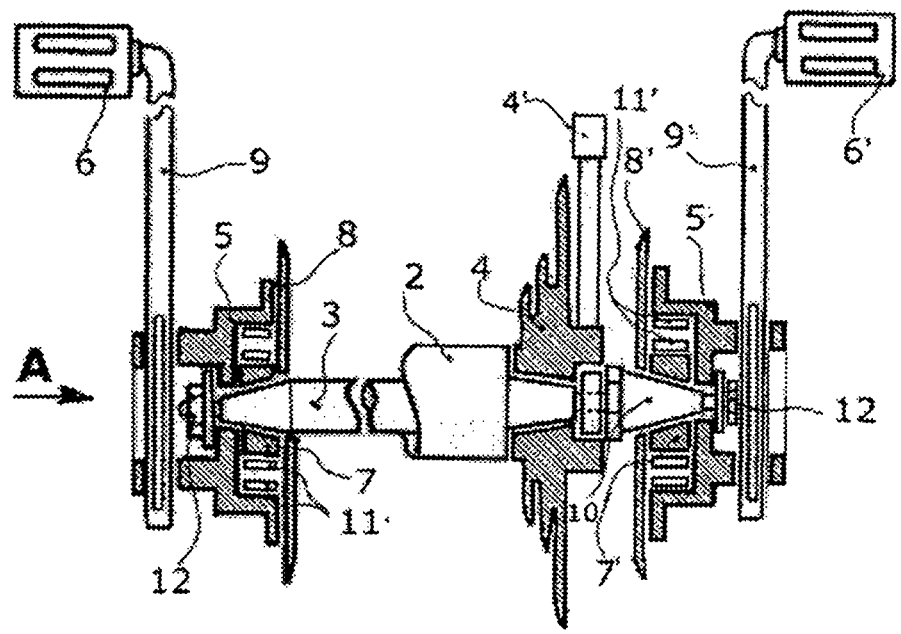

FIG. 3—redesigned drive unit section.

Figure 4:
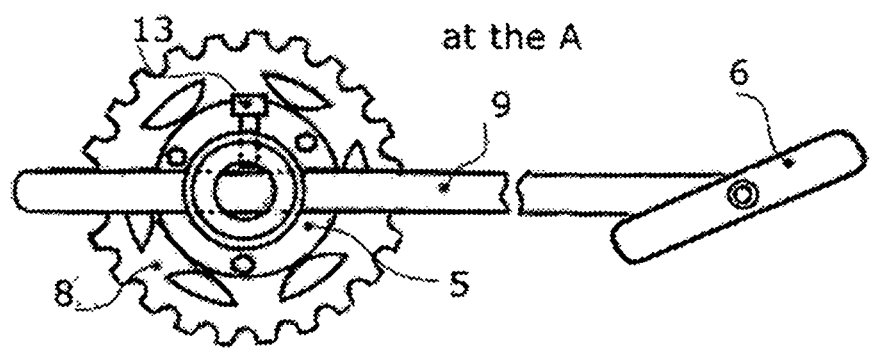

FIG. 4—a side view of the redesigned drive unit following arrow "A".

Figure 5:
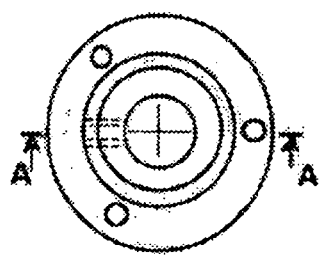

FIG. 5—outside view of the box treadle lever holder.

Figure 6:
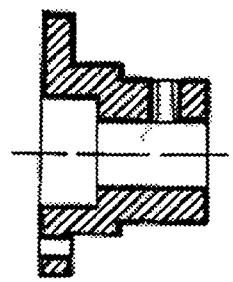

FIG. 6—section "A-A" of the treadle lever holder.

Figure 7:
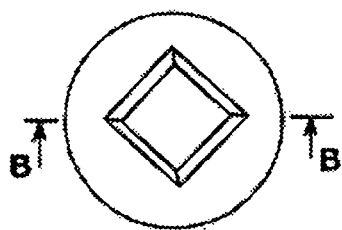

FIG. 7—a side view of the adapter.

Figure 8:
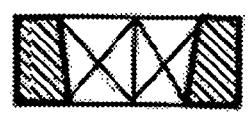

FIG. 8—a section "B-B" of the adapter.

Figure 9:
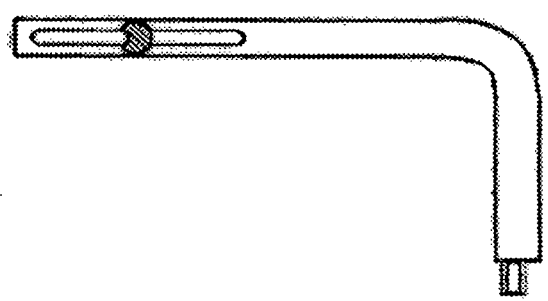

FIG. 9—the outside view of the treadle lever.

Figure 10:
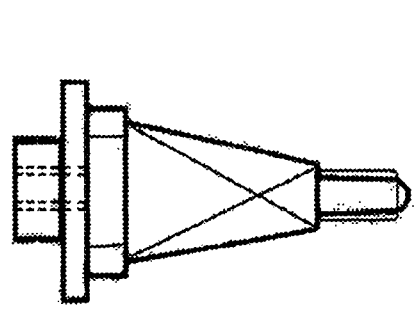

FIG. 10—side view of the drive extension.

Figure 11:
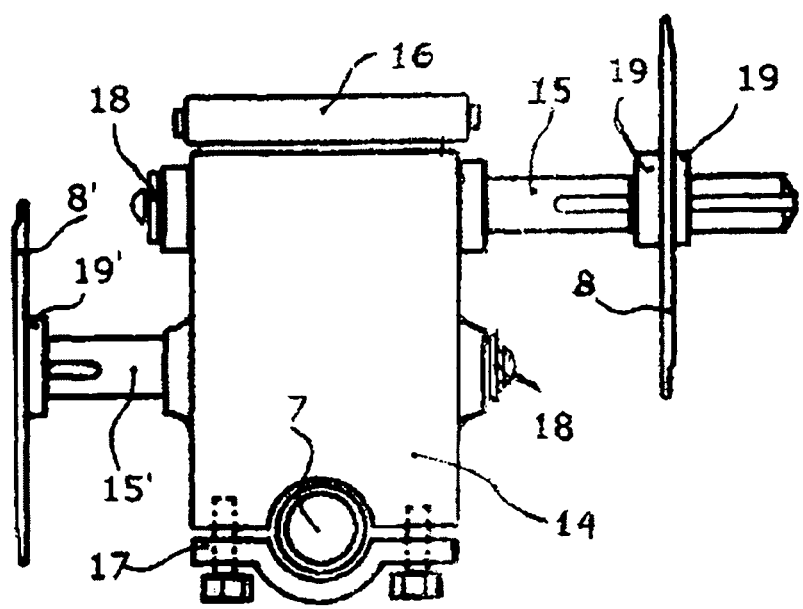

FIG. 11—an assembly drawing of the reverse gear (FIG. 1)

Figure 12:
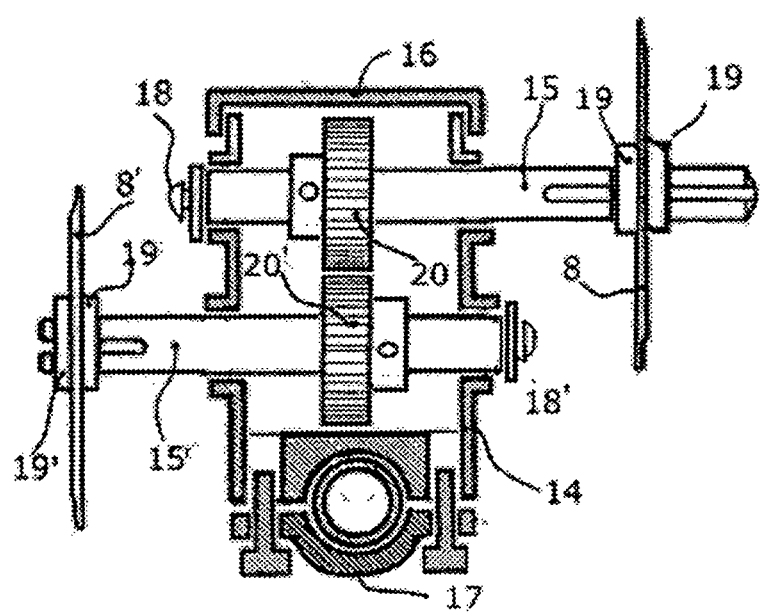

FIG. 12—first embodiment of the reverse gear's section

Figure 13:
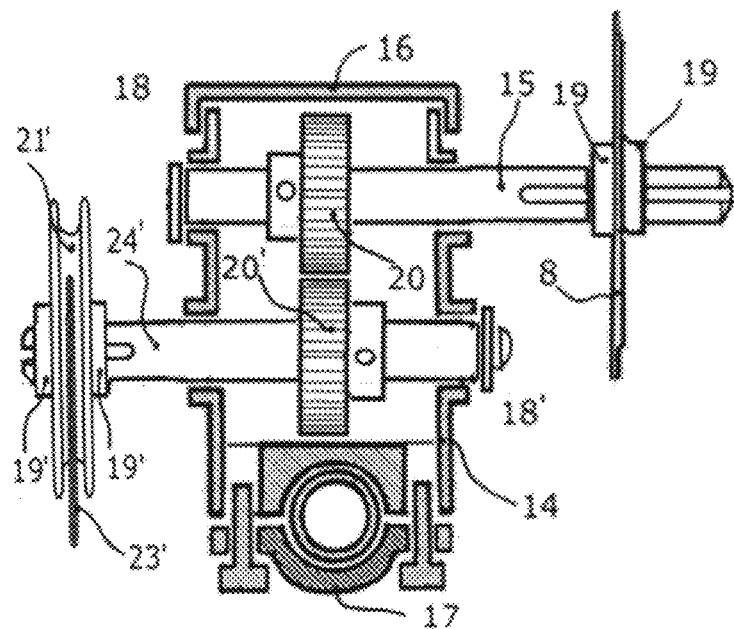

FIG. 13—second embodiment of the reverse gear's section.

Figure 14:
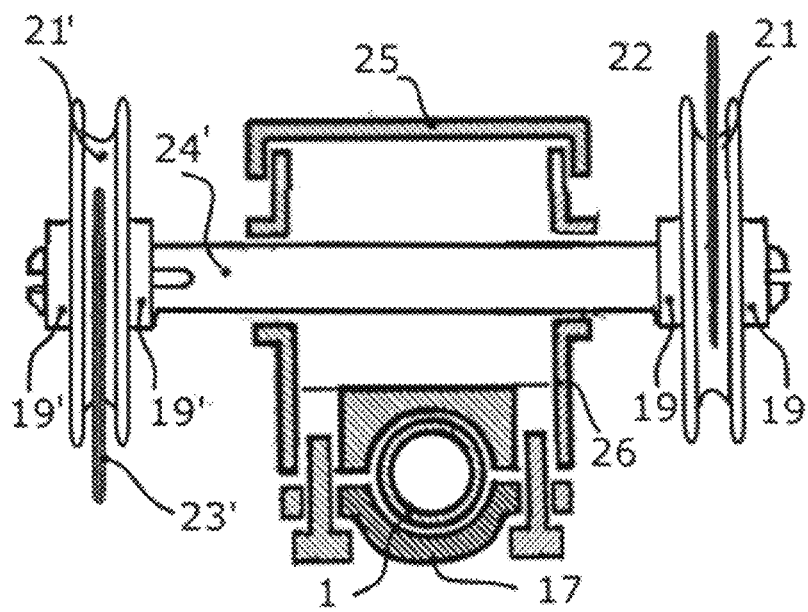

FIG. 14—another embodiment of the reverse gear's section.

DETAILED DESCRIPTION OF THE DRAWINGS

Referring to FIG. 1-FIG. 14:

1—bicycle's frame, 100—the redesigned drive unit; 30—reverse gear; 40 and 45—bicycle's chains, 2—bicycle's axle box, 3—leading driving shaft, 4—an existing unit of chain sprockets for variable speed assemble with undetachable treadle lever 4', 5—box for treadle lever's holder, 6—a pedal, 7—adapter, 8—chain sprocket, 9—treadle lever, 10—additional driving shaft's extension, 11—one way bearing (ratchet), 12—collar nut, 13—locking bolt, 14—box of reverse gear, 15—shaft of the reverse gear, 16—cover of reverse gear, 18—lock of driving shaft, 19—screw for adjustment of the disk clamp, 17—clamp, 20-20'—cogwheels, 21—disk, 22, 23—steel string (or cable), 24—I reverse shaft of another embodiment, 25—cover, 26—box.

How to mount device on a bicycle and to use them.

Before installation, it is necessary to dismount standard pedal levers. After that, mount the redesigned drive unit 100 (see FIGS. 1a, 1b), the reverse gear 30. If your bicycle model has a unit of sprockets installed (on its right side) for variable speed assemble with non-detachable treadle lever 4 on FIG. 2, detach a pedal from the lever 4', and attach additional drive shaft extension 10 FIG. 3 to drive shaft 3. After, install Unit-200 and Unit-300 (see FIGS. 2, 3) and fix them with collar nut 12. (Unit-200 and Unit-300) have the same structure and the opposite direction). Then attach lever (see FIG. 4) to box holder 5, customize lever length, and fix levers 9 and 9' with collars nuts 13.

To mount transmission 40 and 45, follow the next steps:
1—Mount pedal lever 9 (FIG. 1) at the top position.
2—Fix end of chain 40 (FIG. 3) of sprocket 8.
3—Move the second end of chain 40 on sprocket 8 (FIG. 1b)
4—Install pedal lever 9' (FIG. 1a) at the bottom position.
5—Fix end of the chain "45" of sprocket 8' (FIG. 3)
6—Fix another end of chain "45" at the sprocket 8' (FIG. 1a)

Taking sit on the bicycle (see FIGS. 1a, 1b; 3), press pedal 6. Torque will be transferred through a one-way bearing 11(FIG. 3,) and will rotate driving shaft 3 (FIG. 3) through adapter 7. At the same time, the chain "40" cogwheel 20 (FIG. 12) together with cogwheel 20' sprocket 8 and chain 45 in opposite direction. As a result, sprocket 8' (through the chain "45") rotates box "5" (FIG. 3). Box "5" has pedal lever 9' fixed on it, and pedal lever will be rotated counterclockwise to the upper position through one way bearing (ratchet) 11 and lift treadle lever 9' and pedal 6' to top position (FIG. 1b)

While pedal lever 9' and pedal 6' moving down, the process repeats cyclically.

For second and another embodiment, everything is going the same way. The only difference from first embodiment is a pair of disks FIG. 13 installed instead of sprockets pair. For device another embodiment a second pair of disks FIG. 14 installed instead of second sprockets pair.

The invention claimed is:

1. A mountable set for bicycles to provide reduced and one-directional load on leg's muscles, comprising:
   a reverse gear unit, the reverse gear unit including
      a first shaft with a first cogwheel fixed to the first shaft in a middle part of the first shaft,
      a second shaft with a second cogwheel fixed to the second shaft in a middle part of the second shaft, the first shaft is parallel to the second shaft with first and second cogwheel gear teeth meshing,
      a reverse gear unit box rotatively supporting the first and the second shaft, ends of the first and the second shaft extending outside from the reverse gear unit box,
      a first sprocket fixedly attached to an end of the first shaft on a left-side of the reverse gear unit box,
      a second sprocket fixedly attached to an end of the second shaft on a right-side of the reverse gear unit box, and
      a clamp clamping the reverse gear unit box to a bicycle frame away from a bicycle crankset box of the bicycle frame, the bicycle crankset box rotatively supporting a driving shaft, the driving shaft is parallel to the first shaft;
   a left-side drive unit, the left-side drive unit including
      a left-side drive unit box,
      a left-side lever fixed to the left-side drive unit box by a left-side lever first end,
      a first pedal coupled to a left-side lever second end,
      a third sprocket fixedly attached to the left-side drive unit box, and
      a left-side one-way bearing connecting the left-side drive unit box to a left-side end of the driving shaft outside the bicycle crankset box;
   and a right-side drive unit, the right-side drive unit including
      a right-side drive unit box,
      a right-side lever fixed to the right-side drive unit box by a right-side lever first end,
      a second pedal coupled to a right-side lever second end,
      a fourth sprocket fixedly attached to the right-side drive unit box, and
      a right-side one-way bearing connecting the right-side drive unit box to a right-side end of the driving shaft of the bicycle crankset outside the bicycle crankset box;
   wherein the driving shaft having a unit of chain sprockets fixedly attached to the driving shaft outside the bicycle crankset box and adjacent to the right-side driving unit, a left-side chain rotatively connecting the first sprocket to the third sprocket, and a right-side chain rotatively connecting the second sprocket to the fourth sprocket in a way that when a bicycle rider presses forward and down the first pedal, torque being transferred through the left-side one-way bearing to the driving shaft, rotating forward the unit of chain sprockets, with the second pedal being moved by the reverse gear unit in an opposite direction, and when the bicycle rider presses forward and down the second pedal, torque being transferred through the right-side one-way bearing to the driving shaft, rotating forward the unit of chain sprockets, with the first pedal being moved by the reverse gear unit in the opposite direction.

2. The mountable set for bicycles to provide reduced and one-directional load on leg's muscles as in claim 1, wherein the clamp clamping the reverse gear unit box adjacent to a seat of the bicycle frame.

3. The mountable set for bicycles to provide reduced and one-directional load on leg's muscles as in claim 1, wherein the right-side one-way bearing connecting the right-side drive unit to the right-side end of the driving shaft through a driving shaft extension.

* * * * *